(12) United States Patent
Vangala et al.

(10) Patent No.: US 10,171,612 B2
(45) Date of Patent: Jan. 1, 2019

(54) CACHING SERVICE WITH CLIENT-ENABLED ROUTING

(71) Applicant: MICROSOFT TECHNOLOGY LICENSING, LLC, Redmond, WA (US)

(72) Inventors: Vipindeep Vangala, Hyderabad (IN); Ankur Agrawal, Hyderabad (IN); Hari Krishnan, Hyderabad (IN); Venkata Seshu Kumar Kurapati, Hyderabad (IN); Vijay Amrit Agrawal, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 300 days.

(21) Appl. No.: 14/981,304

(22) Filed: Dec. 28, 2015

(65) Prior Publication Data

US 2017/0187820 A1 Jun. 29, 2017

(51) Int. Cl.
*H04L 29/08* (2006.01)
*H04L 29/06* (2006.01)
*H04L 12/741* (2013.01)

(52) U.S. Cl.
CPC .......... *H04L 67/2842* (2013.01); *H04L 45/54* (2013.01); *H04L 67/1002* (2013.01); *H04L 67/42* (2013.01)

(58) Field of Classification Search
CPC . H04L 67/2842; H04L 45/54; H04L 67/1002; H04L 67/42
See application file for complete search history.

(56) References Cited

U.S. PATENT DOCUMENTS 7,894,807 B1 2/2011 Drennan
8,166,200 B2 4/2012 Lev
(Continued)

OTHER PUBLICATIONS

N, et al., "Delay Tolerant Cluster Based Routing for Wireless Sensor Networks", In International Journal of Smart Sensors and Ad Hoc Networks (IJSSAN), Jul. 18, 2012, 4 pages.
(Continued)

*Primary Examiner* — Brian J. Gillis
*Assistant Examiner* — Chhian Ling
(74) *Attorney, Agent, or Firm* — Shook, Hardy & Bacon, L.L.P.

(57) ABSTRACT

Methods, systems, and computer-storage media for intelligently creating and using routing connections between on-premises servers within a client and nodes of a data center are provided. When routing connections being requested by the client are not presently established, a caching service within the data center is programmed to direct a client's cache request over available routing connections, thereby scaling out storage capacity across the data center. When routing connections being requested by the client are established, a load balancer within the data center is programmed to direct the cache request over a requested routing connection, thereby bypassing intervening hops within the data center, such as gateway nodes that host instances of the caching service. To bypass intervening hops, the client network is provided with access to a client-side routing table for identifying an appropriate network key and a connection table for identifying a routing connection mapped to the network key.

20 Claims, 5 Drawing Sheets

(56) References Cited

U.S. PATENT DOCUMENTS

| | | | |
|---|---|---|---|
| 2007/0288647 A1* | 12/2007 | Humphrey | A63F 13/12 709/230 |
| 2009/0193426 A1 | 7/2009 | Bernabeu-Auban et al. | |
| 2010/0271934 A1 | 10/2010 | Holliday | |
| 2011/0016090 A1* | 1/2011 | Krishnaprasad | H04L 67/2842 707/648 |
| 2011/0119400 A1* | 5/2011 | Manion | H04L 45/02 709/242 |
| 2014/0052840 A1* | 2/2014 | Shukla | G06F 9/44505 709/223 |
| 2014/0293986 A1* | 10/2014 | Drennan | H04W 48/18 370/338 |
| 2016/0285825 A1* | 9/2016 | Keohane | H04L 63/0245 |

OTHER PUBLICATIONS

"Sun GlassFish Communications Server 1.5 High Availability Administration Guide", Retrieved on: Jul. 18, 2012, Available at: http://docs.oracle.com/cd/E19355-01/820-4287/gghdz/index.html.

Roy, et al., "Node-Centric Hybrid Routing for Ad Hoc Networks", In Proceedings of International Mobility and Wireless Access Workshop, Oct. 12, 2002, 9 pages.

\* cited by examiner

CACHING SERVICE WITH CLIENT-ENABLED ROUTING

BACKGROUND

Caching a user's data within the context of a cloud-computing network typically involves storing the data in memory locations that are distributed across nodes within a data center (e.g., cluster of servers in the cloud-computing network) using a caching service. The caching service allows users (e.g., clients of a cloud service) to perform various data-management operations (e.g., save, fetch, retrieve, and delete) using network keys, which are partitioned across the nodes in the data center. Because the user's data may be present in any of the data-center nodes—based on a partitioning scheme, available space, and any other storage considerations—a mapping between the network keys and the nodes holding data is maintained within a routing table.

Within the cloud-computing network, the routing table allows the caching service to find and connect to at least one node holding data that is being requested. In conventional systems, clients of the caching service are not provided with the routing table. Generally, clients are not provided the routing table because, in conventional systems, a load balancer that receives requests from the clients is not equipped to handle a request that is targeted to a specific instance within the cloud-computing network. Even if the clients attempt to create a routing table locally, the number of routing connections between the data-center nodes tends to continuously increase or change to support requests from other clients. Further, the routing connections may become unusable due to internal topology changes within the cloud-computing network. Thus, the client-created routing tables are quickly rendered out-of-date.

Further, as the number of routing connections increases, it is not possible to create and maintain all routing connections within the cloud-computing network, due to various infrastructure limitations. In this regard, the embodiments of the present invention, as discussed more fully below, introduce a process for intelligently creating the routing connections between the client and the data center based on, in part, a usage pattern, as well as a process for maintaining and updating a routing table at the client.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to methods, systems, and computer-storage media having computer-executable instructions embodied thereon that, when executed, perform methods in accordance with embodiments hereof for intelligently selecting routing connections between on-premises servers within a client network and nodes within a cloud-computing network. The cloud-computing network represents a hosting environment that is equipped to run a service application, which is capable of being installed as component programs, or roles, in a distributed computing environment. By way of clarification, each role represents an individual class of component that operates in conjunction with other roles of the service application to realize distributed functionality thereof. These roles are placed on nodes (e.g., computing devices) within a distributed data center. In an exemplary embodiment, the nodes are also equipped to maintain partitions of a client's cached data thereon (acting in a storage capacity).

As the number of nodes within the cloud-computing network increases, the number of routing connections to the data center(s) of the cloud-computing network also increases to support requests from the clients. But it is not always possible to create and maintain additional routing connections due to various infrastructure limitations. Along these lines, the embodiments of the present invention, as discussed more fully below, introduce processes for intelligently creating the routing connections between the client and the data center based on, in part, a usage pattern. Further, when routing connections are not present to the client, the innovative processes disclosed herein enable the data center to serve the user requests through server-side forwarding over the available routing connections. In this way, the processes described below as embodiments of the present invention facilitate scaling out caching and accessing data across the data center. When caching is performed by on-premises servers within a client's network, the client may receive a copy of the routing table being used by the caching service of the cloud-computing network. This copy of the routing table, which is stored and examined locally at the client, allows the client to directly link to a primary node holding the cached data, via a load balancer (i.e., establishing a routing connection with two hops).

In conventional networks, cache requests from a client are directed through at least three hops: a load balancer, a gateway node associated with cached data, and a primary node holding the cached data. A discussion of the three hops employed by the conventional networks will follow, for the purposes of comparison.

Initially, cache requests from the client are directed to a virtual Internet protocol (VIP) address of an endpoint of the cloud-computing network. Typically, the endpoint represents or is coupled to a load balancer. The load balancer directs the cache request to one or more instances of the caching service, which is deployed on respective nodes of the data center. These nodes on which instances of the caching service reside are designated herein as "gateway nodes." The gateway nodes are the first nodes to address the cache request after distribution from the load balancer. Generally, these gateway nodes provide storage capacity for hosting a copy of the routing table as well as compute capacity for running an instance of the caching service that examines the routing table in order to redirect the cache request to another node. This other node is designated as a "primary node." Generally, the primary node includes storage capacity for hosting a partition of the client's cached data as well as compute capacity for satisfying the caching request by carrying out some operation with respect to the cached data in the partition.

In operation, upon receiving the cache request at one of the gateway nodes, the gateway node accesses its routing table and compares a network key abstracted from the cache request against the routing table. Specifically, comparison may include inspecting a mapping between the network keys and locations of partitions within the routing table with the abstracted network key. Upon locating a partition on which the sought-after data is stored, using the routing table, the nodes on which the partitions reside are identified. These identified nodes, or "primary nodes" mapped to the network key, are then targeted for receiving the cache request.

The cache request is then directed to the appropriate primary node(s), which host the partition(s) holding the data indicated by the network key. When the cache request is received by the primary node(s), the data is retrieved from partition(s) on the primary node(s) and a response is sent back to the client along the same path (routing connection) by which the caching request was initially sent. Further, upon establishing the routing connection to the primary node(s), subsequent caching requests for the same data are conveyed on this routing connection, allowing the client to reach the same instance of the caching service.

The presence of these three hops (e.g., load balancer, gateway node, and primary node) adds to the overall latency of the caching service. That is, for every cache request, the same processing is conducted twice—once at the gateway node and again at the primary node. As a result, the overall throughput of caching service is diminished. But conventional solutions to avoid one of the three hops are presently ineffective. For example, one conventional solution involves instantiating instances of the client within the data center. Implementing this conventional solution incurs various problems: clients cannot talk to specific instances/primaries directly because the clients are configured with different deployments/subscriptions and, thus, are not provided with a copy of the routing table; the load balancer establishes connections to one of the instances that cannot be controlled by a/the client directly (i.e., client cannot request the load balancer to connect to specific instance of caching service) because the cache requests are directed toward the load balancer before being sent on a routing connection within a data center; and the number of connections that the load balancer is able to support on a deployment/scale unit is limited, thus, the client is not allowed the flexibility to connect to every node of the caching service. In other words, routing connections established using a VIP address through the load balancer are terminated for various reasons, such as network lapses or timeouts, thereby disallowing routing connections to every instance/primary associated with the client's cached data. Further, when the routing connections are reestablished after being terminated, they may be, potentially, directed to different instances/primaries.

To address these problems of conventional solutions and to offer a more efficient experience when using the caching service or any other service that provides look-up capabilities for an application (e.g., SQL service, Table storage, publish/subscribe applications, and client-server applications), embodiments of the present invention provide a hybrid routing service. Generally, the hybrid routing service allows the client to track and select current routing connections by maintaining a mapping of the ongoing routing connections locally at a connections table. Embodiments of the connections table and functionality thereof are discussed more fully below. In particular, embodiments described herein are discussed for exemplary purposes with reference to a caching service. It should be noted that the use of the connections table is not specific to caching services, but may be applied to any stateful application, examples listed above, sitting behind a load balancer. As such, as used herein a caching service can refer to other types of stateful applications such as the exemplary services, applications, and architectures identified above. Further, embodiments of the present invention introduce the process of refreshing the client-side connections table when network changes happen without disrupting the flow of various requests issued by the client.

BRIEF DESCRIPTION OF THE DRAWINGS

Embodiments of the present invention are described in detail below with reference to the attached drawing figures, wherein.

DETAILED DESCRIPTION

Figure 1:
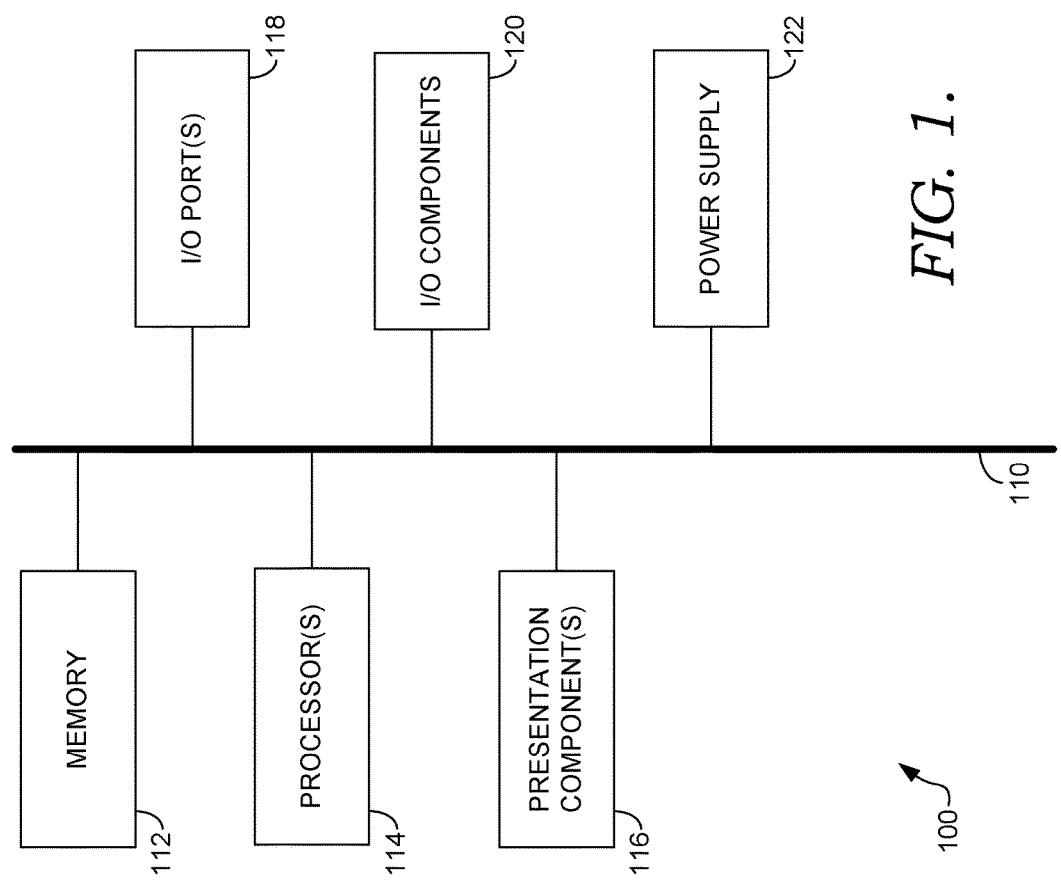
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer-storage media having computer-executable instructions embodied thereon that, when executed, perform methods in accordance with embodiments hereof, for implementing a smart hybrid routing service by intelligently pooling routing connections and providing innovative client-server negotiation. This hybrid routing service may exist either on node(s) within the data center or on on-premises server(s) within the client, or "client network." In operation, the hybrid routing service enables intelligent selection of routing connections, which effectively ensures that only a limited number of routing connections are created to the data center from the client. Selection of the routing connections is based on, in part, detected usage patterns of the client.

In an exemplary embodiment, the routing connections are established from the client to virtual internet protocol (VIP) address of an endpoint of the cloud-computing network. This endpoint represents or is associated with a load balancer. Upon establishing the routing connection, negotiations between the client, load balancer and a gateway node ensures that the client is aware of the instance(s) of the caching service and the partitions on the primary node(s) to which the routing connection is made, thereby ensuring that the client links to an appropriate resource for fulfilling a caching request. These intelligently created routing connections are maintained as a pool and memorialized within a connection table at the client. The connection table is used for selecting suitable routing connections for fulfilling future caching requests on demand. Thus, the connection table provides a routing experience for cached data by targeting specific instances within the cloud-computing network even in the presence of a load balancer. Further, the connection table provides a tool for handling a limited number of total routing connections per client in view system constraints.

Embodiments of the present invention also include a mechanism for distributing and refreshing a routing table at the client while each of the cache requests is being serviced. The use of the updated routing table at the client enables the client to determine network key and/or identity of a partition hosted on a node associated with a portion of data being cached within the cloud-computing network. As such, the hosting environments for underlying the caching service are adaptable to satisfy cache requests submitted by a client while updating localized routing and connection tables provided herein.

Accordingly, in one aspect, embodiments of the present invention relate to one or more computer-readable media that have computer-executable instructions embodied thereon. Upon executing the computer-executable instructions, a method for intelligently selecting routing connections between on-premises servers within the client, or "client network," and nodes within a cloud-computing network is performed. Initially, the method may include detecting an operation within the client network that is directed toward a set of data maintained within the cloud-computing network. A cache request to access the set of data is generated. Typically, generating the cache request involves at least the following steps: identifying a network key mapped to the set of data by examining a client-side routing table; and determining whether an ongoing routing connection between the client network and a node, which is targeted by the first network key, within the cloud-computing network is established by examining a connection table.

When the routing connection is determined to be established, the cache request is sent via the preestablished routing connection. In embodiments, sending the cache request via the preestablished routing connection involves the client network communicating the cache request directly to the targeted node, via a load balancer, over the preestablished routing connection. When the routing connection is determined to be not established, or if the routing connection is not presently available, a connection request is sent to the load balancer of the cloud-computing network. The load balancer is configured to redistribute the cache request to a gateway node that is equipped to access a system-side routing table. In one instance of redistribution when a sought-after routing connection is not present, the load balancer is equipped to select any existing routing connection to serve the cache request. This ensures that even if no routing connection will support the cache request, the cache request will still be distributed from the client network while routing connections are generated in the background, which may be used once available.

The system-side routing table is maintained by the caching service, while instances of the caching service are provisioned on gateway nodes of the cloud-computing network. Typically, the "caching service" represents an application that is employed for accessing a memory-distributed cache within a hosting environment using a network-key space. The network-key space is generally divided into various partitions that are hosted on various nodes, or "primary nodes," distributed within data center(s) of the hosting environment. In this way, a large amount of data may be distributed across the data center(s) by partitioning the data into manageable portions and storing these portions on a plurality of primary nodes within the data center(s). To locate these portions of distributed data, a mapping between each partition (holding a portion of the data) to a corresponding primary node is maintained at the system-side routing table. As discussed more fully below, the system-side routing table may be shared locally with the client network and used to update the local routing table.

In another aspect, embodiments of the present invention relate to a computerized method for detecting inconsistencies within a routing table maintained within the client network. Initially, the method involves generating a cache request for access to a set of data. Typically, the cache request includes a network key for targeting a node (primary node), within in a cloud-computing network, that hosts the set of data. The cache request may be sent with an identifier of the targeted node via a preestablished routing connection. In embodiments, the routing table includes a listing that maps one or more network keys to one or more nodes that have routing connections thereto. Further, the routing connections link on-premises servers within the client network to primary nodes (hosting the client's cached data) within the cloud-computing network. It should be noted that the servers of the client network may be located in whole or in part within the data center as well.

The targeted node, at times, is unable to satisfy the cache request. For instance, the primary node that receives the caching request may be configured to determine that the identifier of the targeted node is not properly directed to itself and, accordingly, insert a notification within a response to the client network. When this occurs, the client network receives the response from a gateway node that indicates the inability of the node targeted by the connection table to serve the cache request (e.g., due to a change within the infrastructure or topology of the cloud-computing network that is not reflected in the connection table). Upon reading the response, the client network is configured to initiate a corrective action that updates the routing table. While the updates to the routing table are occurring in the background, the cache request is still being served upon a server node (initially assumed by the out-date routing table to be the primary node) that receives the cache request acts as a gate way node that forwards the cache request to an appropriate primary node. The response from the appropriate primary node indicates that the client-side routing table is out of date and should be refreshed. Thus, the cache request is served without failure even when it was initially misdirected.

In one embodiment, initiating the corrective action includes issuing a fetch request to retrieve a copy of the system-side routing table. Typically, issuing the fetch request comprises sending the fetch request to an instance of a caching service running on a one or more nodes (gateway nodes) within the cloud-computing network. Upon receiving the fetch request, the caching service is programmed to return the system-side routing table in reply. And, upon receiving the system-side routing table, the client network updates a mapping within the connection table to reflect a changed data-center topology of the cloud-computing network.

In instances where the infrastructure or topology of the cloud-computing network has been changed, a load balancer within the cloud-computing network is configured to ignore the identifier of the targeted node within the cache request and to redirect the cache request to the gateway node hosting an instance of the caching service. Upon receiving the cache request, the gateway node is configured to examine a system-side routing table stored locally and to identify from the system-side routing table a primary node that is able to satisfy the cache request.

In yet another aspect, embodiments of the present invention relate to a computer system capable of satisfying a cache request using routing connections preestablished between on-premises servers within a client network and one or more nodes of a cloud-computing network. Generally, the cloud-computing network includes at least one data center that includes distributed computing devices. Further, the system includes an on-premises server within the client network and a load balancer within the cloud-computing network.

In operation, the server within the client network is equipped to generate a cache request that is designed to access a set of data hosted on the node(s) of the cloud-computing network. Generating the caching request involves the client network identifying a network key mapped to the set of data and determining that an ongoing routing connection between the client network and the node(s) targeted by the network key is established (e.g., using a locally maintained connection table). In instances, the client network is further configured for sending the cache request via the preestablished routing connection to the targeted node(s).

In embodiments, the load balancer is equipped to forward the cache request directly to the one or more targeted nodes over the preestablished routing connection without the cache request being serviced by an intervening node within the cloud-computing network. The load balancer may be further configured for receiving a response from the targeted node(s) over the preestablished routing connection upon satisfying the cache request.

As utilized herein, the phrase "cache request" is not meant to be limiting and generally refers to any communication that includes information pertaining to managing cached data of a client within a data center. In one instance, the cache request includes a description of which set of data is to be accessed and/or a network key (e.g., a key-value pair) that includes an address of the node within the data center targeted by the routing table as well as an identifier of a partition residing on the targeted node that hosts the sought-after data. Further, the cache request may include additional information, such as instructions on how the sought-after data is to be managed (e.g., fetched, deleted, modified, added to, and the like) upon accessing it in the partition of the targeted node, or "primary node."

Although various different embodiments of a hosting environment (e.g., cloud-computing network 360 of FIG. 3) configured with particular arrangements of nodes (e.g., nodes 211-215 of FIG. 3) are described herein, it should be understood and appreciated by those of ordinary skill in the art that other types of suitable infrastructures and topologies of networks/data centers that facilitate serving a cache request using just two hops are contemplated herein, and that embodiments of the present invention are not limited to those nodes and paths between nodes described herein.

A general discussion of the distributed nature of the hosting environments employed by embodiments of the present invention is provided immediately below. Generally, the hosting environment includes various nodes with portions of data and segments of service applications distributed throughout the nodes. The portions of the data (e.g., data cached for remote clients) are divided into sets of data that are stored on partitions within the nodes. These partitions are tracked using the system-side routing tables (e.g., reference numeral 335 of FIG. 3) in order to gain future access to the data. The segments of the service applications are referred to herein as "roles." The roles provide a template description of a functional portion of the service application, such as the caching service. Roles are described by indicating the computer code implementing the role, the conditions within the hosting environment that are required by the role, configuration settings to be applied to the role, and the role's set of endpoints for communication with other roles, elements, etc. In one instance, the role's configuration settings may include collective settings that are shared by all instances of the role, or individual settings that are particular to each instance of the role. In an exemplary embodiment, each role represents a particular class of component program of the service application. Typically, a service model (e.g., service level agreement) or other guideline provided to the cloud-computing network delineates how many instances of each of the roles to place within the data center (e.g., data center 310 of FIG. 3), where each of the instances is a replication of the particular class of components, or role. In other words, each role represents a collection of instances of each class of component, where the service application may have any number of classes of component for carrying out functions thereof. Accordingly, each role represents a particular class of component that operates in conjunction with other roles of the service application to realize distributed functionality thereof.

Having briefly described an overview of embodiments of the present invention, an exemplary operating environment suitable for implementing embodiments of the present invention is described below.

An exemplary computing environment suitable for use in implementing embodiments of the present invention is described below to provide a general context for various aspects of the present invention. Referring to FIG. 1, such an exemplary computing environment is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

The computing device 100 typically includes a variety of computer-readable media. Computer-readable media may be any available media accessible by the computing device 100 and includes both volatile and nonvolatile media, removable and nonremovable media. Computer-readable media comprises computer storage media and communication media; computer storage media excludes signals per se. Computer storage media includes volatile and nonvolatile, removable and nonremovable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, nonremovable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, a camera, joystick, game pad, satellite dish, scanner, printer, wireless device, etc.

Aspects of the subject matter described herein may be described in the general context of computer-executable instructions, such as program modules, being executed by a mobile device, on-premises servers at the client (e.g., client network 350 of FIG. 3), and/or nodes within a hosting environment. Generally, program modules include routines, programs, objects, components, data structures, and so forth, which perform particular tasks or implement particular abstract data types. Aspects of the subject matter described herein may also be practiced in distributed computing network where tasks are performed by remote processing devices that are linked through a communications network. In a distributed computing network, program modules may be located in both local and remote computer-storage media including memory storage devices. Furthermore, although the term "server" or "node" is often used herein, it will be recognized that this term may also encompass partitions holding data, instances of roles of a service application (e.g., caching service), a set of one or more processes distributed on one or more computers, one or more stand-alone storage devices, a set of one or more other computing or storage devices, a combination of one or more of the above, and the like.

Figure 2:
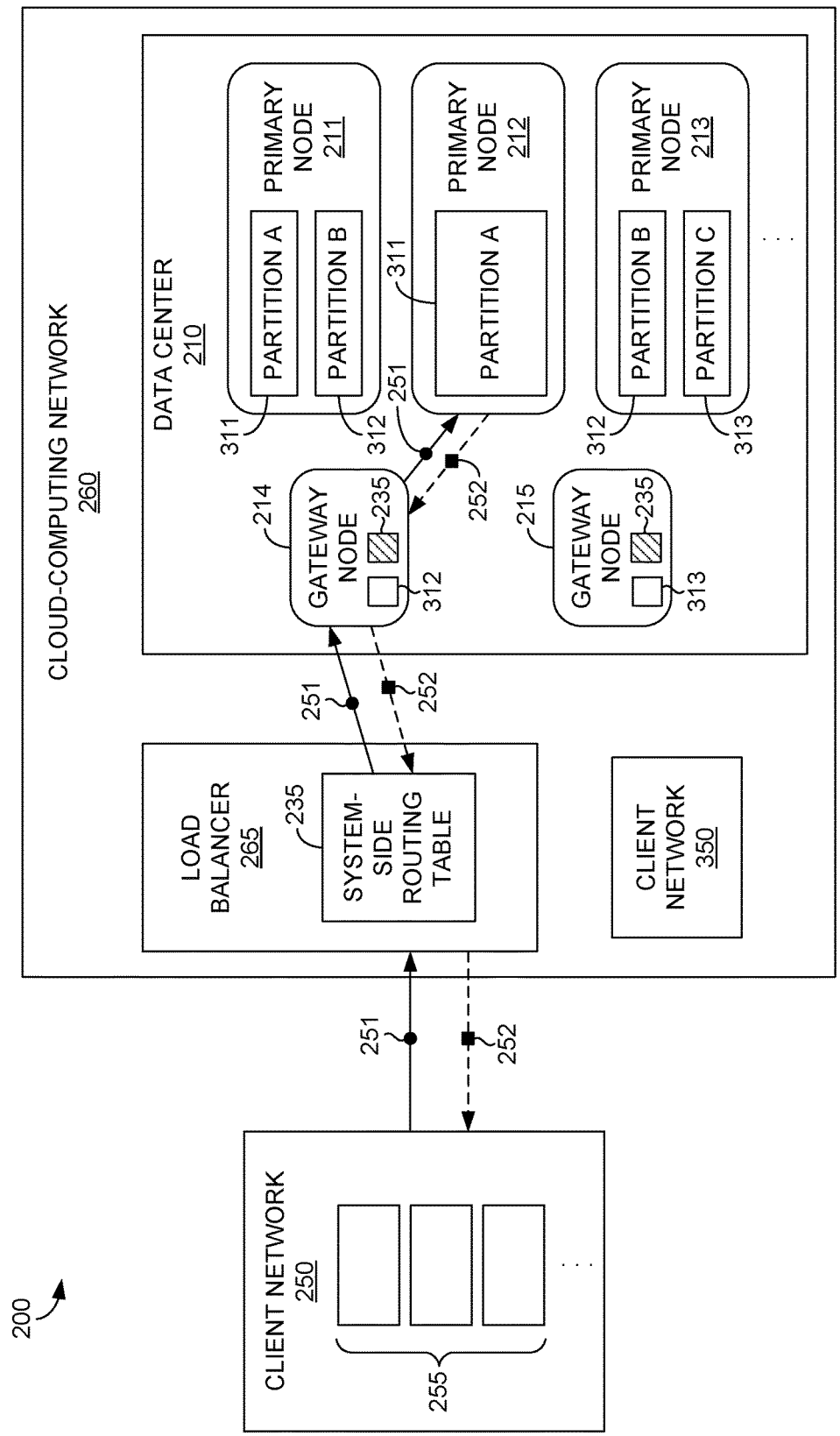
FIG. 2 is a block diagram illustrating a data center, suitable for use in directing a caching request over three hops according to a particular solution.

Turning to FIG. 2, a block diagram illustrating a system architecture 200 with a data center 210, suitable for use in directing a caching request over three hops according to a particular solution, is shown. The data center 210 interacts with a load balancer 265 within the cloud-computing network 260, while a client network 250 interacts with the load balancer 265 through a VIP address. The thin lines with arrowheads represent a forwarding path (solid lines) of a cache request 251 from the client through the cloud-computing network 260 and a return path (dashed lines) of a response 252 from a primary node 212 serving the cache request 251.

Figure 3:
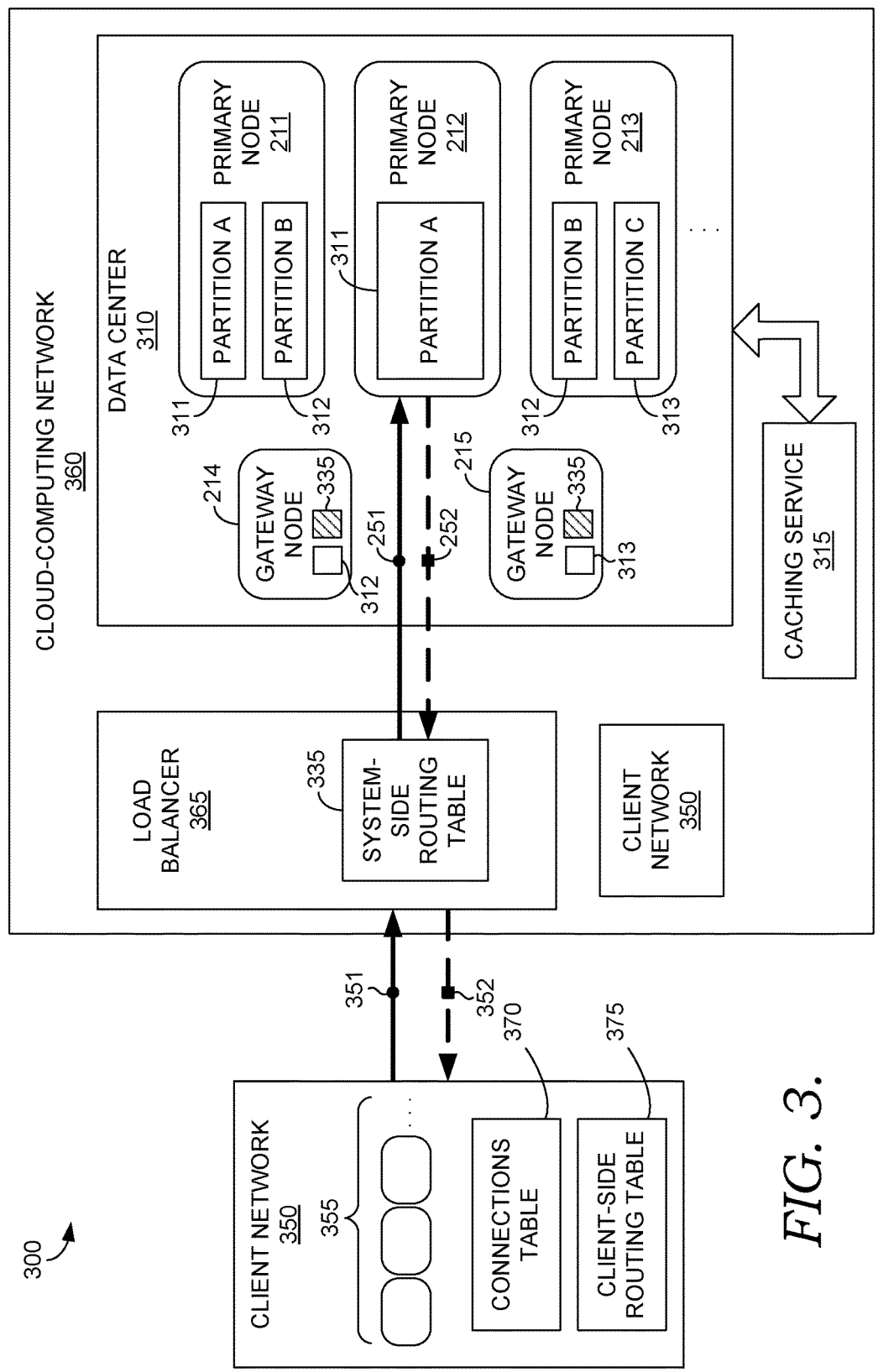
FIG. 3 is a block diagram illustrating a data center, suitable for use in implementing embodiments of the present invention, that is configured to accommodate and support operation of instances of a caching service, which are responsible for serving caching requests from a client network.

It should be noted that, although the client network 350 is described as being located remotely from the data center 210 (i.e., on premises at a client site), some or all of the infrastructure and/or resources of the client network 350 may reside locally within the data center 210 or integrated within an topology of the cloud-computing network 360 (as illustrated in FIGS. 2 and 3).

Regarding how the caching service conventionally operates, initially, one of the on-premises servers 255 of the client network 250 creates a routing connection with the caching service through the load balancer 265 using a VIP address to reach an endpoint of the cloud-computing network 260. The data center 210 then establishes a routing connection with any instance of the caching service on one of the gateway nodes 214 or 215. Accordingly, the first hop for serving the cache request occurs between the client network 250 and the load balancer 265, while the second hop occurs by establishing a routing connection between the load balancer 265 and an instance of the caching service on the gateway node 214, as illustrated in FIG. 2. It should be noted that the gateway nodes 214 and 215 host instances of the caching service, where these caching-service instances are in communication with partitions 311-313 that are identified using network keys conveyed within the cache request 251. In embodiments, the gateway nodes 214 and 215 may also include partitions (e.g., 312 and 313) as serve as a primary node when the cache request 251 is directed to one of those partitions.

In one instance, upon receiving the cache request 251, the load balancer 265 selects the gateway node 214 based on a number of routing connections already established between the load balancer 265 and the gateway nodes 214 and 215 of the data center 210. Typically, the decision of which node to select is based upon the amount of capacity being exhausted at each of the gateway nodes 214 and 215. This selection of the node by the load balancer 265 occurs randomly from the perspective of the client network 250. Stated another way, when client network 250 performs an operation (e.g., put, get, or add) directed to data within a cache stored at the data center 210, the load balancer 265 is solely responsible for directing the cache request 251 using one of the preestablished connections to the gateway nodes 214 and 215.

Upon the load balancer 265 selecting the gateway node 214 from the plurality of nodes to which routing connections are established and upon directing the cache request 251 to the selected gateway node 214, the gateway node 214 (first node) reads a network key being conveyed within the cache request 251. Then the gateway node 214 compares the network key being passed within the cache request 251 against the system-side routing table 235 to determine an identifier of a partition (e.g., partition A 311 as illustrated in FIG. 2) holding the appropriate data to fulfill the cache request 251 and an address of the node (e.g., primary node 212 as illustrated in FIG. 2) that hosts the partition. The gateway node 214 then directs the cache request 251 to the primary node 212 (second node) within the data center 210 via the address and to the partition A 311 on the primary node 212 via the identifier.

In operation, the primary node is responsible for using memory resources for maintaining the sought-after cached data within the partition A 311 and for using processing capacity for carrying out the instructions within the cache request 251. The primary node 212 is also responsible for generating and sending a response 252 back to the gateway node 214. The gateway node 214 subsequently forwards the response to the client network 250 through the load balancer 265 along the same path as the cache request 251 was previously transmitted.

Turning now to FIG. 3, a block diagram is illustrated showing a system architecture 300, in accordance with an embodiment of the present invention. The system architecture 300 includes a data center 310, suitable for use in implementing embodiments of the present invention, configured to accommodate and support operation of instances of a caching service, which are responsible for serving caching requests 351 from a client network 350. It will be understood and appreciated by those of ordinary skill in the art that the data center 310 shown in FIG. 3 is merely an example of one suitable for accommodating one or more hosting environments, such as cloud-computing network 360, and is not intended to suggest any limitation as to the scope of use or functionality of embodiments of the present invention. Neither should the data center 310 be interpreted as having any dependency or requirement related to any single resource (e.g., partitions A 311, B 312, and C 313), nodes (e.g., nodes 211-215), or combination of resources and nodes. Further, although the various blocks of FIG. 3 are shown with lines for the sake of clarity, in reality, delineating various components is not so clear, and metaphorically, the lines would more accurately be grey and fuzzy.

The nodes 211-215 of the data center 310 are linked to a load balancer 365 via routing connections within the cloud-computing network 360. These nodes 211-215 represent tangible computing elements that host various resources and/or software components (e.g., instances of a caching service 315). The routing connections interconnect these nodes 211-215 such that the partitions A 311, B 312, and C 313, which may be distributably placed across various primary nodes 211-213 of the data center 310, may have channels of communication established to the load balancer 365 via instances of the caching service 315. In addition, the cloud-computing network 360 facilitates forwarding the cache requests 351 and returning the responses 352 over routing connections that link the load balancer 365 directly to the primary nodes 211-213 without passing through intervening nodes (e.g., gateway nodes 214 and 215). The cloud-computing network 360 may include, without limitation, one or more local area networks (LANs) and/or wide area networks (WANs). Such networking environments are commonplace in offices, enterprise-wide computer networks, intranets, and the Internet. Accordingly, the network is not further described herein.

With continued reference to FIG. 3, the nodes 211-215 are typically operably coupled with each other via the communication channels and/or routing connections established across the cloud-computing network 360. The routing connections are shown in FIG. 3 as the thick lines with arrowheads, where some thick lines represent a forwarding path (solid lines) of the cache request 351 from the client network 350 through the cloud-computing network 360 and other thick lines represent a return path (dashed lines) of a response 352 from the primary node 212 serving the cache request 351. It should be noted that, if a direct routing connection of FIG. 3 is not present, not established, or unavailable, the load balancer 365 is equipped to establish and/or employ indirect routing connections of FIG. 2 to serve the cache request 351.

As discussed herein, the term "node" is not meant to be limiting, but to encompass all forms of computing devices, such as, for example, a personal computer, a desktop computer, a laptop computer, a handheld device, a mobile handset, consumer electronic device, and the like. In one aspect, the node represents a computing device of a plurality of distributed computing devices interconnected via the cloud-computing network 360. Generally, these distributed computing devices are capable of executing a plurality of instances of the caching service 315 as well as hosting various partitions A 311, B, 312, and C 313 that maintain a client's cached data. Further, the data center 310 may include any number of the physical resources, and may include any collection of computing devices, or other machines capable of running instances of the caching service 315 as well as hosting various partitions A 311, B, 312, and C 313. In operation, the caching service 315 is equipped to manage access to the partitions A 311, B, 312, and C 313 over wired or wireless network paths through the data center 310 using system-side routing tables 335 provisioned on the gateway nodes 214 and 215.

It should be noted that embodiments of the present invention are not limited to implementation on such physical resources (e.g., nodes 211-215) illustrated in FIG. 3, but may be implemented on any of a variety of types of computing devices and equipment within the scope of embodiments hereof. In other words, illustrated resources of the data center 310 depict an exemplary configuration only that is intended for discussion purposes only; accordingly, any suitable layout of resources known in the computing industry may be used and is contemplated by the present invention.

The caching service 315 will now be discussed. Generally, the caching service 315, in embodiments of the present invention, is programmed to establish routing connection(s) between one or more on-premises servers 355 of the client network 350 and the partitions A 311, B, 312, and C 313 that can be used to efficiently send cache requests 351 and return responses 352. When the routing connections are made available, the system-side routing table 335 may be transferred to the client network 350 and maintained as a client-side routing table 375. The client network 350 may use the client-side routing table 375, in conjunction with a connections table 370, to send the cache requests 351 directly to an appropriate primary node. Directly sending the cache requests 351 involves establishing routing connections to the primary nodes 211-213 hosting the partitions A 311, B, 312, and C 313 targeted by network keys conveyed within the cache requests 351.

To implement the direct delivery of the cache request 351 between the client network 350 and the primary nodes 211-213, over the routing connections via the load balancer 365, a tool referred to herein as the "hybrid routing client" is employed. The hybrid routing client comprises the components, mechanisms (e.g., caching service 315), and processes described herein that build efficiencies into a cached data-management system. For example, embodiments of the hybrid routing client include processes at the caching service 315 that allow for addressing and distributing a cache request 351 using the client-side routing table 375 in conjunction with connection table 370, as well as processes at the cloud-computing network 360 that read and forward the cache request 351 directly to a primary node (e.g., reference numeral 212) without stopping at a gateway node (e.g., reference numeral 214), if the appropriate routing connections are in place.

The operation of the hybrid routing client will now be discussed with reference to FIG. 3. Initially, the client network 350 receives the client-side routing table 375 (facilitated by the caching service 315) upon establishing a usage of a remote cache within the data center 310. The routing table 375 is employed to generate routing connections to nodes of the data center 310 using a VIP address through the load balancer 365. In one embodiment, the routing table 375 is used to provide a network key (e.g., key-value pairs) for a sought-after piece of data to establish an uplink to the data center 310. Typically, within the key-value pair, the key is directed to a partition (e.g., partition A 311 of FIG. 3), which may reside on one or more nodes, while the value is directed to one of the primary nodes (e.g., primary node 212 of FIG. 3) that hosts the partition.

Upon identifying the set of data being targeted by the client network 350, a cache request 351 is constructed with the network key and is sent to the load balancer 365 over the uplink to the cloud-computing network 360. In an exemplary embodiment, as shown in FIG. 3, the load balancer 365 abstracts the network key from the cache request 351 and compares it against a system-side routing table 335. In one instance, comparing involves inspecting the system-side routing table 335 with the network key, where the system-side routing table 335 is populated with a mapping of addresses and identifiers to values and keys, respectively, of the network key.

Upon performing the comparison, the load balancer 365 is configured to identify which node the network key is directed to and a location of the node on which the cached data is stored. The load balancer 365 may then forward the cache request 351 to the identified node (e.g., primary node 212) targeted by an entry of the system-side routing table 335. The steps above allow for only two network hops (load balancer 365 and primary node 212) and assume that there is a preexisting routing connection between the load balancer 365 and the primary node 212 within the cloud-computing network 360.

But when a cache request 351 is made with a network key for which the routing connection to the corresponding primary node 212 does not presently exist, the cache request 351 is served by asynchronously creating a new routing connection. Upon creating this routing connection to the corresponding primary node 212, the established routing connection may be reused. Further, creating the routing connection in response to the cache request 351 generates a link to node within the data center 310 that holds cached data, yet is not necessarily the corresponding primary node 212.

Upon asynchronously creating the routing connection, the cache request 351 may indicate to the load balancer 365 whether to generate the routing connection in request mode or demand mode. Typically, request mode has higher chance of quick convergence than demand mode. When the cache request 351 includes an asynchronous connection request within the "request mode," the load balancer 365 receives and processes the connection request. Processing the connection request involves linking a node to the load balancer 365 by establishing a routing connection thereto. The newly linked node returns its address n2 back to the load balancer 365 that just established the newly ongoing routing connection. The load balancer then passes the address n2 back to the client network 350.

Once the client network 350 receives the address n2, it compares the address n2 against an address n1 of the primary node 212 identified within the client-side routing table and specified by the network key of the cache request 351. When the address n2 matches the address n1, the client network 350 is provided the appropriate network connection and the client network 350 retains the network connection within the connections table 370. However, when the address n2 does not match the address n1 and when the routing connection to address n2 is not listed in the connections table 370, a determination of whether the partition on the linked node with address n2 is able to satisfy the cache request 351 for the sought-after cached data. When the partition on the linked node with address n2 is able to satisfy the cache request 351, the routing connection is preserved within the connections table 370. When preserved within the connections table 370 this new routing connection may be used for serving future cache requests for the same sought-after cached data. However, when the partition on the linked node with address n2 is unable to satisfy the cache request 351, the newly established routing connection is terminated and not recorded in the connections table 370 because the client network has no use for the newly created routing connection to the linked node of address n2.

When the cache request 351 includes an asynchronous connection request within the "demand mode," the load balancer 365 receives and processes the connection request. Processing the connection request involves identifying that the connection request has specified an address n1 to which the client network 350 intends to connect within a negotiation process. That is, in the demand mode, the client network 350 specifies an intent for the load balancer 365 to create a routing connection with a node of the address n1, as opposed to any node that holds partitions of cached data. For instance, the client network 350 may specify the node(s) within the data center 310 on which partition(s) storing its cached data reside and to which there are no preestablished routing connections currently available.

In response to the connection request of the cache request 351, the load balancer 365 establishes a routing connection. The newly linked node returns its address n2 back to the load balancer 365 that just established the newly ongoing routing connection. The load balancer then passes the address n2 back to the client network 350 in the demand mode, similar to the request mode.

Once the client network 350 receives the address n2, it compares the address n2 against an address n1 of the primary node 212 identified within the client-side routing table and specified by the network key of the cache request 351. When the address n2 matches the address n1, the client network 350 was provided the appropriate network connection and the client network 350 retains the network connection within the connections table 370 as address n3. Address n3 is subsequently used for accessing cached data associated with the network key of the cache request 351. However, dissimilar to the request mode, in the demand mode, if address n2 is dissimilar to address n1, the client network 350 instructs the load balancer 365 to close the newly established routing connection and to retry creating the link to another node of the data center 310. Stated another way, when the client network's 350 mode of operation is the demand mode, the newly established routing connection is closed if it links to a node other than the particular primary node (e.g., primary node 212) that is specified within the connection request embedded within the cache request 351.

With continued reference to FIG. 3, exemplary processes for carrying out the negotiation process between the load balancer 365 and the client network 350 will now be discussed. Initially, the negotiation process involves creating an uplink from the client network 350 to the caching service 315 through the load balancer 365 using the VIP address. The caching service 315, in cooperation within the system-side routing table 335, creates a routing connection in an attempt to reach the sought-after cached data within one or more nodes of the data center 310. Generally, the client network 350 is unable to control the selection of the node to which the load balancer 365 creates the routing connection. Thus, the negotiation process involves the load balancer 365 returning node addresses and other connection information to the client network 350 upon making a routing connection to particular nodes within the data center 310. Typically, each routing connection made by the load balancer 365 will cause the load balancer 365 to return connection information (e.g., address of node(s) that were selected to serve the cache request 351) to the client network 350, which stores the connection information for future use.

In embodiments, storing the connection information involves maintaining a connections table 370 locally at the client network 350. Typically, the connections table 370 is generated during an initial handshake between the client network 350 and caching service 315. The connections table 370 includes a listing of the returned node addresses that have routing connections established within the cloud-computing network 360. For example, if the load balancer 365 creates a routing connection to a node with address n3, upon processing the cache request 351, the newly established routing connection is added as an entry to the connections table 370 indicating that the node with the address n3 is actively linking.

As discussed above, during the initial negotiation process, the client network 350 receives a copy of the system-side routing table 335 for the cache of data it is storing at the data center 310. The system-side routing table 335 is saved locally at the client network 350 as the client-side routing table 375 and includes a mapping between network keys and address/identifiers of nodes/partitions hosting portions of cached data. These nodes listed within the client-side routing table 375 are equipped to serve the cache request 351 upon receipt thereof.

In operation, when the client network 350 desires to connect with a set of data being held at the data center 310, the cache request 351 is made for the set of data associated with a network key. The client-side routing table 375 is then inspected to identify a target node that hosts a partition that stores the set of data. Once the appropriate target node is identified, the connection table is referenced to determine whether there are any available routing connections that are made to this target node. If a routing connection exists to the target node, as indicated by a connection pool listed in the connections table 370, the routing connection is selected and cache request 351 is sent using that routing connection. In this way, the cache request 351 may be delivered directly from the client network 350 to the target node (e.g., primary node 212 of FIG. 3) without an additional hop at an intervening node (e.g., gateway node 214). Thus, by intelligently creating and maintaining connection pool within the connections table 370 locally at the client network 350 (using server-client negotiation discussed above), an efficient routing experience is provided even when interacting via the load balancer 365.

In embodiments, the client network 350 may reach a steady state where routing connections to each of the primary nodes holding cached data is generated and available within the connection pool of the connections table 370. Reaching the steady state involves determining whether a routing connection to a targeted node exists and, if not, choosing an existing routing connection within the cloud-computing network 360 and conveying the cache request 351 over the chosen routing connection. Choosing the existing routing connection may be carried out by employing any known selection algorithm (e.g., round robin, least recently used, common default pool, and the like). At the same time, an attempt is made to create a new routing connection to the targeted node asynchronously, as more fully described above. As a result of asynchronously creating the new routing connection, there would may be a fair chance that the new routing connection would be created, live, and available to the targeted node when next cache request 351 is directed to the targeted node. Accordingly, at any point, each of the plurality of cache requests being distributed by the client network 350 is served by the caching service 315 without being denied even if a routing connection to a particular node designated to serve a certain cache request does not presently exist.

Embodiments of the present invention may employ usage patterns to optimize the establishment of routing connections when a limit on the maximum number of routing connections is in place. A limit on the number of routing connections may be in place for the following reason. If there are 'N' nodes being used by the caching service 315, and 'P' partitions for holding the client network's 350 cached data, for all cache requests to be routed to partitions on target nodes serving requests for cached data—without adding hops on gateway nodes—the client network 350 requires a maximum of Min {N, P} routing connections. Further, if the client network 350 expects 'S' routing connections to each of the primary nodes holding the cached data, the client network 350 requires a maximum of S*Min {N, P} routing connections.

Due to various capacity restrictions inherent with the cloud-computing network 360, there may be a limit on the number of routing connections (e.g., 1 to Min{N, P}) that may be created and remain available to the client network 350 on a cloud-computing network 360. Thus, the client network 350 may not always have Min {N, P} or S*Min {N, P} routing connections at its disposal. Accordingly, embodiments of the present invention optimally select the routing connections to maintain within the cloud-computing network 360 (satisfying the upper limit of allowable routing connections) while, at the same time, invoking routing methodology to serve incoming cache requests. In one instance, optimally selecting routing connections involves detecting usage patterns that provide a basis for choosing the routing connections that will remain active and identifying those routing connections that are to be closed. For example, usage patterns may be employed to identify and maintain frequently and/or recently accessed partitions (e.g., partition A 311 of FIG. 3) hosted on one or more nodes within the data center 310. Accordingly, routing connections to these node(s) will be preserved and available in the connections table 370 such that cache requests to these "hot" nodes will be sent directly to the appropriate targeted node (e.g., primary node 212 of FIG. 3) without passing through an intervening node (e.g., gateway node 214 of FIG. 3). Alternatively, usage patterns may be employed to identify and tear down rarely accessed partitions (e.g., partitions B 312 and C 313 of FIG. 3) that are rarely used for serving cache requests from the client network 350, thereby freeing resources within the cloud-computing network 360 for higher-priority requests. Accordingly, routing connections to nodes hosting rarely used partitions will not be available in the connections table 370 and cache requests to these "cold" nodes will be sent through an intervening node (e.g., gateway node 214 of FIG. 3) before reaching the appropriate targeted node (e.g., primary node 212 of FIG. 3). It should be noted that cache requests to cold nodes will likely comprise a minority of the total cache requests being distributed by the client network 350, thus, preserving overall performance improvement.

This exemplary system architecture 300 is but one example of a suitable environment that may be implemented to carry out aspects of the present invention, and is not intended to suggest any limitation as to the scope of use or functionality of the invention. Nor should the illustrated exemplary system architecture 300 be interpreted as having any dependency or requirement relating to any one or combination of the nodes 211-215 as illustrated. In some embodiments, one or more of the partitions A 311, B, 312, and C 313 may be implemented on stand-alone devices or reside in tandem on one or more of the nodes 211-213, as illustrated. In other embodiments, one or more of the instances of the caching service 315 may be integrated directly into a centralized location or distributed to run locally on at least one node of the data center 310. It will be understood by those of ordinary skill in the art that the nodes 211-215 illustrated in FIG. 3 are exemplary in nature and in number and should not be construed as limiting.

Typically, each of nodes 211-215 and/or each of the on-premises servers 355 of the client network 350 include, or is linked to, some form of a computing unit (e.g., central processing unit, microprocessor, etc.) to support operations of the component(s) running thereon (e.g., connections table 370 and client-side routing table 375)). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral or operably coupled thereto to enable each of the nodes 211-215 and/or each of the on-premises servers 355 to perform communication-related processes and other operations (e.g., generating cache requests 351 and returning responses 352). In another instance, the computing unit may encompass a processor (not shown) coupled to the computer-storage medium accommodated by each of the nodes 211-215 and/or the on-premises servers 355. Generally, the computer-storage medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., satisfying the cache requests 351).

Figure 4:
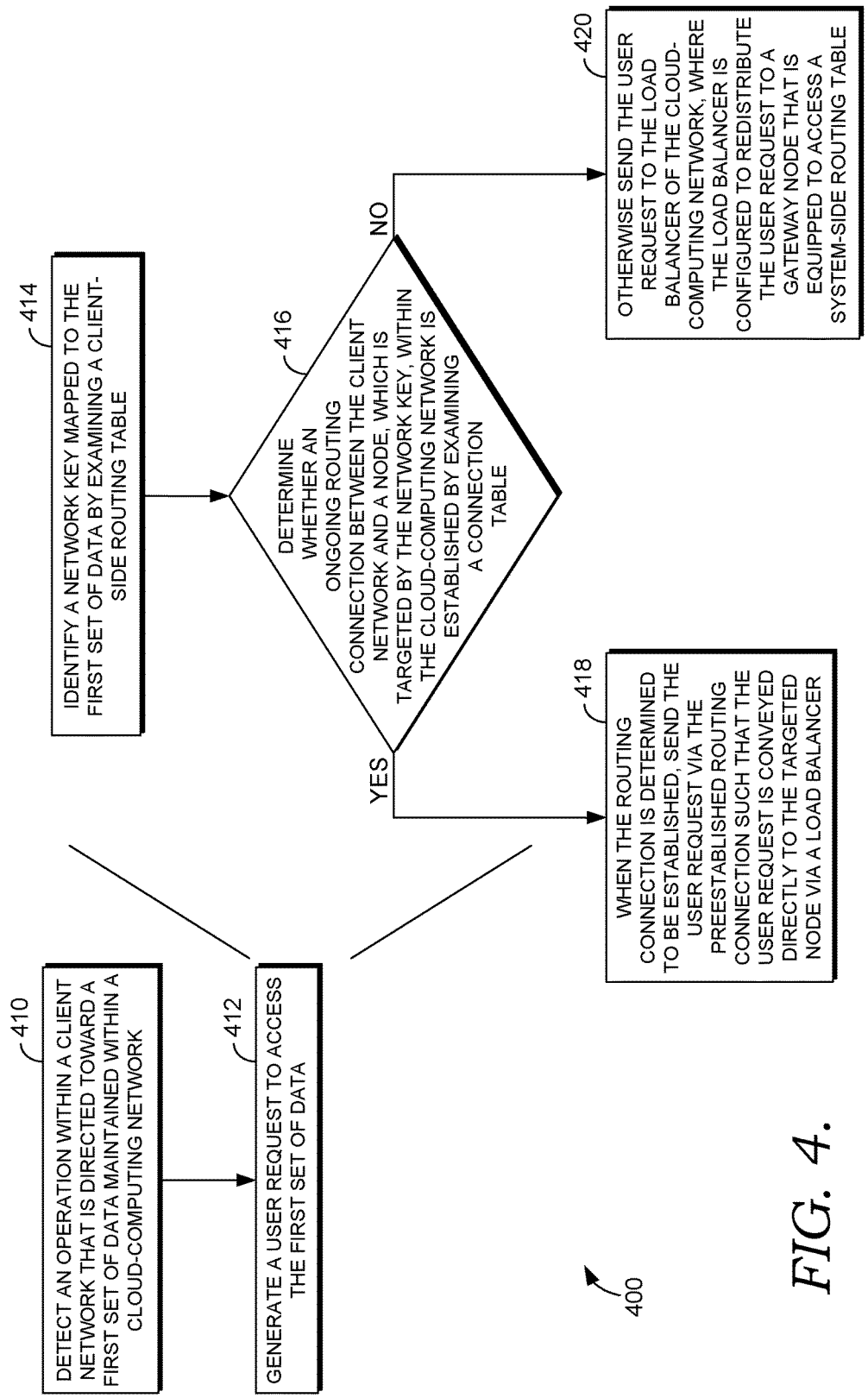
FIG. 4 is a flow diagram showing an overall method for intelligently selecting routing connections between on-premises servers within a client network and nodes within a cloud-computing network, in accordance with an embodiment of the present invention.

Turning now to FIG. 4, a flow diagram is shown illustrating an overall method 400 for intelligently selecting routing connections between on-premises servers within a client network and nodes within a cloud-computing network is shown, in accordance with an embodiment of the present invention. Initially, the method 400 may include detecting an operation within the client network that is directed toward a set of data maintained within the cloud-computing network, as depicted at block 410. As depicted at block 412, a cache request to access the set of data is generated. Typically, generating the cache request involves at least the following steps: identifying a network key mapped to the set of data by examining a client-side routing table (see block 414); and determining whether an ongoing routing connection between the client network and a node (see block 416), which is targeted by the first network key, within the cloud-computing network is established by examining a connection table.

When the routing connection is determined to be established, the cache request is sent via the preestablished routing connection, as depicted at block 418. In embodiments, sending the cache request via the preestablished routing connection involves the client network communicating the cache request directly to the targeted node, via a load balancer, over the preestablished routing connection. When the routing connection is determined to be not established, a connection request is sent to the load balancer of the cloud-computing network, as depicted at block 420. The load balancer is configured to redistribute the cache request to a gateway node that is equipped to access a system-side routing table. In embodiments, the load balancer may conduct a plurality of iterations of cache requests for routing connections until there is a scenario in which the connections table is populated with a robust number of entries. These entries within the connections table expose a pool of routing connections that are active within the cloud-computing network and the entries may be updated as additional routing connections are determined to be more frequently and/or recently used by the client network.

Figure 5:
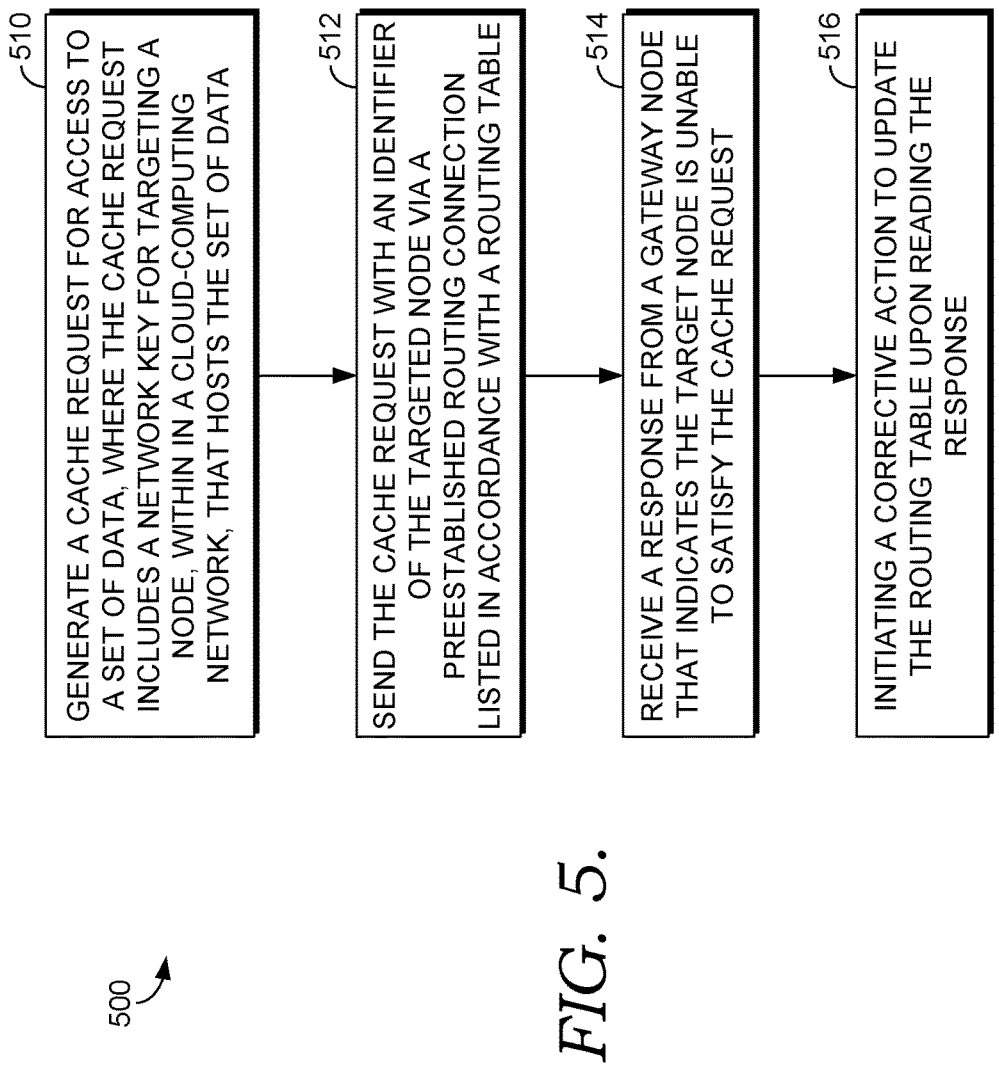
FIG. 5 is a flow diagram detecting inconsistencies within a client-side routing table maintained within the client network, in accordance with an embodiment of the present invention.

Turning to FIG. 5, a method 500 for detecting inconsistencies within a client-side routing table maintained within the client network is shown, in accordance with an embodiment of the present invention. Initially, when deployment changes happen within a data center (e.g., a number of running nodes increases or decreases), the mapping within the routing table should adjust to correspond with the current topology of the cloud-computing network. For example, if the client network retains a stale routing table, then connection information between an address of a primary node and a network key of a partition known to the client network may differ from what actually exists within the data center, thereby diminishing efficiencies gained by using a client-side routing table. Accordingly, embodiments of the present invention provide a mechanism that interacts between the client network and the caching service to dynamically update the client-side routing table to reflect the current topology of the data center. In operation, the mechanism may be employed to indicate that a configuration of the nodes within the data center has changed. This indication may result from a notification proactively provided by the caching service, by the mechanism discovering a change to the data-center topology, or by reading contents of a response from the node attempting to serve a user request, which can be interpreted as change of configuration.

Returning to FIG. 5, the mechanism may be employed in the following manner. Initially, a cache request for access to a set of data may be generated, as depicted at block 510. In one instance, the cache request includes a network key for targeting a node, within a cloud-computing network, that hosts the set of data. As depicted at block 512, the cache request with an identifier of the targeted node is sent via a preestablished routing connection listed within the connection table. Upon receiving and reading the cache request at the targeted node, the targeted node may observe that the client request is directed to a wrong primary node and, in reply, may send a notification (e.g., flagged response) informing the client network to refresh the client-side routing table. As depicted at block 514, the client network may receive the notification from a gateway node that indicates the target node is unable to satisfy the cache request. At this point, the client network may commence initiating a corrective action to update the connection table upon reading the response, as depicted at block 516. In one instance, the corrective action may involve triggering an asynchronous refresh of the client-side routing table. In another instance, the corrective action may involve re-fetching the system-side routing table from the caching service to merge with and/or make updates to the client-side routing table.

It should be noted, with respect to FIGS. 4 and 5, that any number of steps may be employed to achieve the desired functionality within the scope of embodiments of the present invention. Although the various steps of FIGS. 4 and 5 are shown with lines for the sake of clarity, in reality, delineating various components is not so clear, and metaphorically, the lines would more accurately be grey or fuzzy. Further, although some steps of FIGS. 4 and 5 are depicted as single processes, the depictions are exemplary in nature and in number and are not to be construed as limiting.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages that are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed, perform a method for intelligently selecting routing connections between on-premises servers within a client network and nodes within a cloud-computing network, the method comprising:
   detecting an operation within the client network that is directed toward a set of data maintained within the cloud-computing network;
   generating a cache request to access the set of data, wherein generating the cache request comprises:
   identifying a first network key mapped to the set of data, by examining a client-side routing table; and
   determining whether an ongoing routing connection between the client network and a node within the cloud-computing network, is established, by examining a client-side connection table, wherein the node is targeted by the first network key;
   when the routing connection is determined to be established, sending the cache request via the preestablished routing connection; and
   otherwise, sending a connection request to a load balancer of the cloud-computing network.

2. The media of claim 1, wherein sending the cache request via the preestablished routing connection comprises communicating the cache request directly to the targeted node, via the load balancer, over the preestablished routing connection.

3. The media of claim 2, wherein, when the routing connection is determined to be not established, the load balancer is configured to redistribute the cache request to a gateway node that is equipped to access a system-side routing table.

4. The media of claim 1, wherein the first network key represents a key-value pair that points to the targeted node.

5. The media of claim 4, wherein the key-value pair includes a key that is directed to a particular partition holding the set of data, wherein the particular partition is hosted on one or more nodes within the cloud-computing network.

6. The media of claim 5, wherein the key-value pair includes a value that is directed to the targeted node hosting one instance of the particular partition.

7. The media of claim 1, wherein the method further comprises, when the preestablished routing connection is determined to not be established, creating a new routing connection to fulfill the cache request.

8. The media of claim 7, wherein creating the new routing connection comprises sending the cache request to the load balancer of the cloud-computing network, wherein the load balancer is configured to return a second network key for a primary node of the cloud-computing network to which the load balancer has established a second ongoing routing connection.

9. The media of claim 8, wherein the method further comprises terminating the second ongoing network connection when the second network key for the primary node is listed within the connection table.

10. The media of claim 8, wherein creating the new routing connection comprises determining whether the primary node selected by the load balancer is able to satisfy the cache request by accessing the set of data.

11. The media of claim 10, wherein the method further comprises, when the primary node is determined to be able to satisfy the cache request, adding the second ongoing routing connection to the listing within the connection table.

12. The media of claim 1, wherein the cache request is sent over a path within the cloud-computing network to reach the targeted node, and wherein a response is returned over the path from the targeted node to the client network.

13. A computer system for performing a method that attempts to satisfy a cache request using routing connections preestablished between on-premises servers within a client network and one or more nodes distributed within a cloud-computing network, the system comprising:
   a server within the client network for generating a cache request to access a set of data hosted on the one or more nodes by identifying, via a client-side routing table, a network key mapped to the set of data and determining, via a client-side connection table, that an ongoing routing connection between the client network and the one or more nodes targeted by the network key is established, wherein the server is further configured for sending the cache request via the preestablished routing connection to the one or more targeted nodes; and a load balancer for forwarding the cache request directly to the one or more targeted nodes over the preestablished routing connection without the cache request being serviced by an intervening node within the cloud-computing network, and wherein the load balancer is further configured for receiving a response from the one or more targeted nodes over the preestablished routing connection upon satisfying the cache request.

14. A method for intelligently selecting routing connections between on-premises servers within a client network and nodes within a cloud-computing network, the method comprising:

detecting an operation within the client network that is directed toward a set of data maintained within the cloud-computing network;

generating a cache request to access the set of data, wherein generating the cache request comprises:

identifying a first network key mapped to the set of data, by examining a client-side routing table; and determining whether an ongoing routing connection between the client network and a node within the cloud-computing network, is established, by examining a client-side connection table, wherein the node is targeted by the first network key;

when the routing connection is determined to be established, sending the cache request via the preestablished routing connection; and otherwise, sending a connection request to a load balancer of the cloud-computing network.

15. The method of claim 14, wherein sending the cache request via the preestablished routing connection comprises communicating the cache request directly to the targeted node, via the load balancer, over the preestablished routing connection, wherein, when the routing connection is determined to not be established, the load balancer is configured to redistribute the cache request to a gateway node that is equipped to access a system-side routing table.

16. The method of claim 14, wherein the first network key represents a key-value pair that points to the targeted node, and wherein key-value pair includes a key that is directed to a particular partition holding the set of data, wherein the particular partition is hosted on one or more nodes within the cloud-computing network.

17. The method of claim 14, wherein the first network key represents a key-value pair that points to the targeted node, and the key-value pair includes a value that is directed to the targeted node hosting one instance of a particular partition holding the set of data.

18. The method of claim 14, the method further comprising:

when the preestablished routing connection is determined to be not established, creating the new routing connection to fulfill the cache request, wherein creating a new routing connection comprises sending the connection request to the load balancer of the cloud-computing network, wherein the load balancer is configured to determining whether a primary node selected by the load balancer is able to satisfy the cache request by accessing the set of data and return a second network key for the primary node of the cloud-computing network to which the load balancer has established a second ongoing routing connection; and terminating the second ongoing network connection when the second network key for the primary node is listed within the connection table.

19. The method of claim 18, the method further comprising:

when the primary node is determined to be able to satisfy the cache request, adding the second ongoing routing connection to the listing within the connection table.

20. The method of claim 14, wherein the cache request is sent over a path within the cloud-computing network to reach the targeted node, and wherein a response is returned over the path from the targeted node to the client network.

* * * * *